(12) United States Patent
Maywar et al.

(10) Patent No.: US 7,684,708 B2
(45) Date of Patent: Mar. 23, 2010

(54) ALL-OPTICAL FLIP-FLOP AND CONTROL METHODS THEREOF

(75) Inventors: Drew Maywar, Rochester, NY (US); Govind P. Agrawal, Rochester, NY (US)

(73) Assignee: University of Rochester, Rochester, NY (US)

( * ) Notice: Subject to any disclaimer, the term of this patent is extended or adjusted under 35 U.S.C. 154(b) by 53 days.

(21) Appl. No.: 12/206,012

(22) Filed: Sep. 8, 2008

(65) Prior Publication Data
US 2009/0067300 A1 Mar. 12, 2009

Related U.S. Application Data

(60) Provisional application No. 60/970,338, filed on Sep. 6, 2007.

(51) Int. Cl.
*H04B 10/00* (2006.01)
(52) U.S. Cl. .............. 398/106; 398/107; 398/108; 398/109; 398/110; 398/111; 398/112; 369/47.1; 359/108
(58) Field of Classification Search ............ 369/47.1; 340/825.69; 359/108; 398/106–114
See application file for complete search history.

(56) References Cited

U.S. PATENT DOCUMENTS

| 4,340,864 | A | * | 7/1982 | Malinowski et al. | ........ | 327/113 |
|---|---|---|---|---|---|---|
| 4,573,767 | A | | 3/1986 | Jewell | | |
| 4,608,552 | A | * | 8/1986 | Boutonnat et al. | ..... | 340/538.15 |
| 4,630,898 | A | | 12/1986 | Jewell | | |
| 6,456,417 | B1 | | 9/2002 | Maywar et al. | | |
| 7,027,016 | B2 | * | 4/2006 | Sakashita | ..................... | 345/84 |
| 7,039,372 | B1 | * | 5/2006 | Sorrells et al. | ............. | 455/118 |
| 2003/0068990 | A1 | * | 4/2003 | Sorrells et al. | ............. | 455/118 |

OTHER PUBLICATIONS

Kawaguchi et al; Gigahertz all-optical flip-flop operation of polarisation-bistable vertical-cavity surface-emitting lasers; Electronic Letters; Jul. 6, 1995; vol. 31; No. 14; 1150-1151.
Maywar et al; Robust optical control of an optical-amplifier-based flip-flop; Optics Express; Jan. 31, 2000; vol. 6, No. 3; 75-80.
Maywar et al; All-optical hysteresis control by means of cross-phase modulation in semiconductor optical amplifiers; Optical Society of America; Jul. 2001; vol. 18, No. 7; 1003-1013.
Jewell et al; Use of a single nonlinear Fabry-Perot etalon as optical logic gates; Appl. Phys. Lett; vol. 44, No. 2, Jan. 15, 1984; American Institute of Physics; 172-174.

(Continued)

*Primary Examiner*—Evelyn A. Lester
(74) *Attorney, Agent, or Firm*—William Greener; Bond, Schoeneck & King, PLLC

(57) ABSTRACT

Embodiments of the invention pertain to remote optical control of holding beam-type, optical flip-flop devices, as well as to the devices themselves. All-optical SET and RE-SET control signals operate on a cw holding beam in a remote manner to vary the power of the holding beam between threshold switching values to enable flip-flop operation. Cross-gain modulation and cross-polarization modulation processes can be used to change the power of the holding beam.

23 Claims, 5 Drawing Sheets

OTHER PUBLICATIONS

Tai et al; External off and on switching of a bistable optical device; Appl. Phys. Lett.; vol. 40, No. 3; Feb. 1, 1982; American Institute of Physics; 205-207.

Nakatsuhara et al; GaInAsP-InP Distributed Feedback Waveguides for All-Optical Switching; IEEE Journal of Selected Topics in Quantum Electronics; vol. 6, No. 1; Jan./Feb. 2000; 143-149.

Ogasawara et al; Static and Dynamic Properties of Nonlinear Semiconductor Laser Amplifiers; Japanese Journal of Applied Physics; vol. 25, No. 9; Sep. 1986, L739-L742.

Inoue et al; All-optical flip-flop operation in an optical bistable device using two lights of different frequencies; Optics Letters; vol. 12, No. 11; Nov. 1987; 918-920.

Nakai et al; Optical Bistability in a Semiconductor Laser Amplifier; Japanese Journal of Applied Physics; vol. 22, No. 5; May 1983; L310-L312.

\* cited by examiner

# ALL-OPTICAL FLIP-FLOP AND CONTROL METHODS THEREOF

RELATED APPLICATION DATA

The instant application claims priority to U.S. provisional application Ser. No. 60/970,338 filed on Sep. 6, 2007, the disclosure of which is incorporated herein by reference in its entirety.

FEDERALLY SPONSORED RESEARCH

Embodiments of the invention were made with government support under Cooperative Agreement No. DE-FC52-92SF19460 sponsored by the U.S. Department of Energy Office of Inertial Confinement Fusion. The government may have certain rights in the invention.

BACKGROUND

1. Field of the Invention

Embodiments of the invention are most generally related to the field of optical signal processing. More particularly, embodiments of the invention are directed to holding beam-type, all-optical flip-flop devices and control methods thereof and, even more particularly, to remote control and polarization-independent control methods of holding beam-type, all-optical flip-flop devices as well as the devices themselves.

2. Related Art

Sequential data processing (i.e., processing with memory) is conventionally performed in the electric domain, where the latchable, output electrical signal from an electrical flip-flop is set and reset by the action of electrical control signals. More recently, sequential data processing has been realized in the optical domain. Optical flip-flops are applicable to any signal processing function that requires memory; they enable the evolution from combinational logic (for which the output signal is determined solely by the existing input signals) to sequential logic, for which the memory of past input signals also determines the state of the output signal. Examples of such applications include data-format conversion (e.g., return-to-zero (RZ) to non-return-to-zero (NRZ)), 3R regeneration (power, shape and time domains), temporal demultiplexing with bit-length stretching, switching and routing, buffering, memory, as well as the functionalities of clocks and oscillators, clock dividers, latches, resisters, counters, adders, and transistors. Some advantages of sequential processing methods and apparatus in the optical domain include high speed of operation (e.g., bandwidth exceeding 1 GHz), EMI/EMP resistance, the absence of the need for optical-to-electronic conversion, which allows control signals to originate directly from digital optical data and communication networks, the evolution of Photonic Integrated Circuits (PICs) that may provide a substantial increase in reliability, functionality, and reconfigurability, as well as substantial reduction in power usage, physical footprint, and hardware and deployment costs.

Flip-flop devices that operate on the basis of optical bistability such as dispersive bistability, absorptive bistability, mixed dispersive and absorptive bistability, and four-wave-mixing bistability, for example, utilize a continuous-wave (cw) holding beam. Control (SET, RE-SET) signals may operate by various processes to change the power of the holding beam or the required switching power threshold of the bistable medium.

SET and RE-SET operation in a resonant-type semiconductor optical amplifier (RT-SOA)-based flip-flop was previously reported using an optical modulator that increased and decreased the holding beam power, but did not use optical control signals. A RT-SOA-based flip-flop provides a desirable non-linear bistable medium by reason of its sub-millimeter size, optical gain, and strong nonlinearity. SOAs also have the potential for integration into PICs and for supporting switching at 40 Gb/s and above. A direct optical RE-SET technique was previously reported using a closely tuned (within 0.008 nm) optical beam that interfered with the holding beam within the bistable RT-SOA. Remote optical RE-SET was previously reported using cross-phase modulation (XPM) to reduce the holding-beam power passing through a dye-filled Fabry-Perot cavity. Optical SET and RE-SET techniques have also been demonstrated using widely detuned (>30 nm) pulses that entered the bistable RT-SOA and varied the optical-power hysteresis by means of cross-phase modulation (XPM). The interested reader is directed to the following for further information: U.S. Pat. No. 6,456,417; Maywar, Nakano, and Agrawal, *Robust optical control of an optical-amplifier-based-flip-flop,* OPTICS EXPRESS 6, No. 3, pp 75-80 (January 2000); and, Maywar, Nakano, and Agrawal, *All-optical hysteresis control by means of cross-phase modulation in semiconductor optical amplifiers,* J. OPT. SOC. AM. B 18, No. 7, pp 1003-1013 (July 2001), the subject matters of which are incorporated by reference herein in their entireties to the fullest extent allowed by applicable laws and rules.

In addition to in-line RT-SOA bistable media for optical flip-flops, recent research has focused on bistable vertical cavity semiconductor optical amplifiers (VCSOAs), which are advantageous for some applications due to their compact, symmetrical-waveguide, surface-emitting design.

SUMMARY

The inventors have recognized the various benefits and advantages to be obtained from both remote control- and polarization-independent control-methods for holding beam-type, all-optical flip-flop devices, as well as the devices themselves.

An embodiment of the invention is a remote-control signal, holding beam-type, all-optical flip-flop device that includes a non-linear, optical, bistable medium characterized by an upward switching threshold and a downward switching threshold; a nonlinear, holding beam power modulator that can effect an increase and a decrease in the power of the holding beam, located remotely from the bistable medium; a holding beam generator that can generate a holding beam that can operatively engage the nonlinear, holding beam power modulator; a holding beam propagation medium intermediate the nonlinear holding beam power modulator and the bistable medium; at least one control signal generator that can generate at least one of an optical SET control signal and an optical RE-SET control signal; and an optical control signal propagation medium disposed intermediate the at least one control signal generator and the nonlinear, holding beam power modulator. In various non-limiting aspects, the non-linear, optical, bistable medium may be characterized by dispersive bistability, absorptive bistability, mixed dispersive-absorptive bistability, and four-wave mixing bistability. In various non-limiting aspects, the non-linear, optical, bistable medium may be a resonant type-semiconductor optical amplifier (RT-SOA) including, but not limited to, a vertical cavity-surface emitting semiconductor optical amplifier (VC-SOA), a Fabry-Perot SOA (FP-SOA), a distributed-feedback SOA (DFB-SOA), or a ring resonator with an internal SOA. According to a non-limiting aspect, the non-linear, holding beam power modulator is an optical amplifier. According to a non-limiting aspect, the non-linear, holding beam power modulator is a nonlinear birefringent medium followed by a waveplate and a polarizer.

An embodiment of the invention is a method for remotely-controlling a holding beam-type all-optical flip-flop device that includes generating an optical SET control signal pulse and an optical RE-SET control signal pulse; generating a continuous-wave holding beam; propagating the holding beam through a nonlinear, holding beam power modulator and into a non-linear, optical, bistable medium characterized by an upward switching threshold and a downward switching threshold; and propagating the optical RE-SET control signal and the optical SET control signal through the nonlinear, holding beam power modulator and decreasing and increasing the power of the holding beam, respectively. According to various non-limiting aspects, the power of the holding beam may be both increased and decreased by the effect of the optical SET and RE-SET control signals on the holding beam, respectively, by a cross-gain modulation (XGM) process or a cross polarization rotation process. Advantageously, the all optical flip-flop device operation as embodied herein is controlled entirely remotely due to the modulation of the holding beam power entirely remotely from the bistable medium by operation of the remotely applied all-optical SET and RE-SET control signals.

As used herein, the term 'operatively engages' means that there is an operational change between the input and the output due to an interaction of two or more things being engaged.

The embodied apparatus and methods disclosed herein are considered applicable to any optical flip-flop that is enabled by a holding beam.

According to a non-limiting exemplary application, the flip-flop device is embodied as an optical memory device characterized by remotely-controlled all optical SET and RE-SET control signals, wherein the optical SET and RE-SET control signals are operationally controlled by data to be stored in the optical memory device.

Other non-limiting, illustrative and exemplary embodiments and aspects will be disclosed herein and will be understood by a person skilled in the art.

DETAILED DESCRIPTION OF CERTAIN EXEMPLARY EMBODIMENTS OF THE INVENTION

Figure 1:
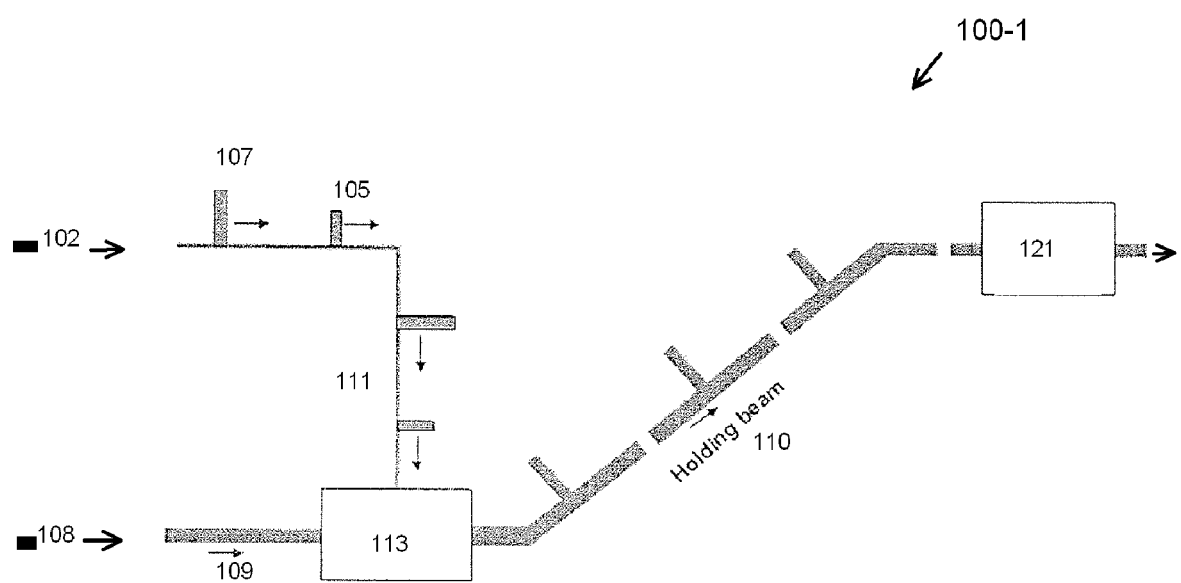
FIG. 1 is a schematic drawing of an all-optical flip-flop device according to a non-limiting exemplary embodiment of the invention.

FIG. 1 schematically shows a remotely-controlled, holding beam-type, all-optical flip-flop device 100-1 according to a non-limiting exemplary embodiment of the invention. The device includes a non-linear, optical, bistable medium 121 characterized by an upward switching threshold and a downward switching threshold. A nonlinear, holding beam power modulator 113 is located remotely from the bistable medium 121. A holding beam generator 108 that can generate a cw holding beam 109 is disposed to input the holding beam to the nonlinear modulator 113, where the holding beam will be engaged by all-optical SET and RE-SET control signals to increase and decrease the power of the holding beam. A holding beam propagation medium 110 is provided between the nonlinear modulator 113 and the bistable medium 121. At least one control signal generator 102 is provided to generate at least one of an optical SET control signal pulse 105 and an optical RE-SET control signal pulse 107. According to an aspect, both of the SET and the RE-SET optical pulse may be generated by a common control signal pulse that is split by various means known in the art. A control signal propagation medium 111 is disposed intermediate the at least one control signal generator 102 and the nonlinear modulator 113, whereby the optical SET and RE-SET control signals can operatively engage the holding beam in the nonlinear modulator to remotely (from the bistable medium) modulate the power of the holding beam.

According to a non-limiting illustrative aspect, the optical control signal and holding beam propagation media are optical waveguides. Other media including free space and other physical or EM wave-guiding media as known in the art may be suitable.

The bistable medium may be characterized by dispersive bistability, absorptive bistability, mixed dispersive-absorptive bistability, and four-wave mixing bistability and, in the illustrative case of dispersive bistability, the bistable medium 121 advantageously is a non-linear optical resonator.

In operation, the all-optical SET and RE-SET control signals 105, 107 are applied in a 'remote' manner to the nonlinear holding beam power modulator 113, as illustrated in FIG. 1. The 'remote' manner referred to herein means that neither the SET control signal nor the RE-SET control signal directly enter the bistable medium to effect flip-flop operation by the holding beam; rather, the power of the holding beam is changed (i.e., both increased and decreased) with respect to the bistable medium switching threshold values by direct operation of the optical control signals in the remotely located non-linear modulator.

Figures 2A, 2B, 2C:
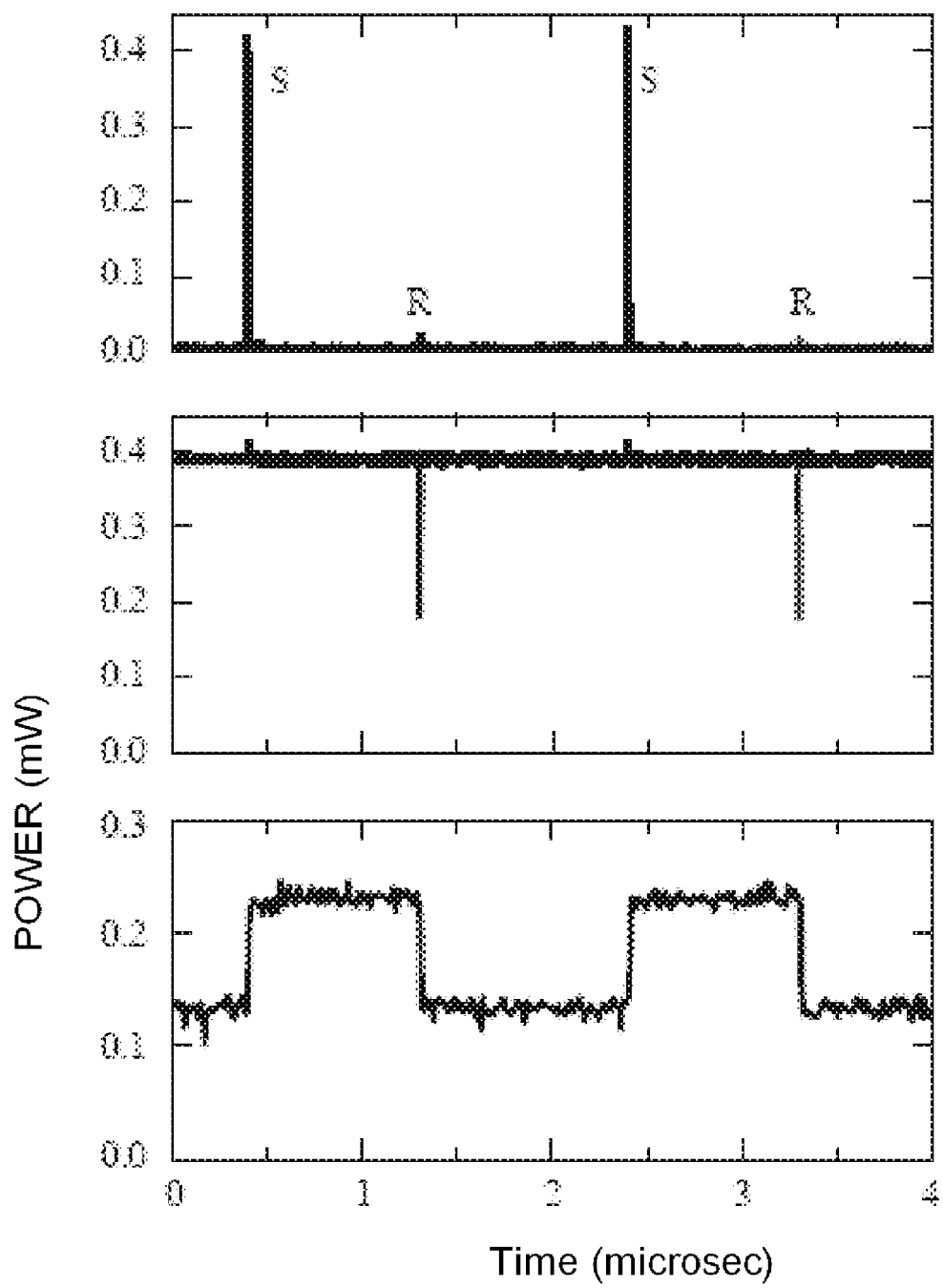
FIG. 2*a* shows a monitor trace of the SET (S) and RE-SET (R) optical control signals according to an illustrative aspect of the invention.
FIG. 2*b* shows a monitor trace of the holding beam exiting the non-linear, holding beam SOA power modulator under the influence of the all-optical control signals according to an illustrative embodiment of the invention; and, FIG. 2*c* shows a monitor trace of the bistable output of the flip-flop according to an illustrative embodiment of the invention.

With reference to FIG. 2, the SET (S) and RE-SET (R) optical control signals as shown in FIG. 2*a* operatively engage the non-linear modulator 113 and vary the holding beam power as illustrated in FIG. 2*b* through, e.g., a cross-gain modulation (XGM) process. The holding beam then operatively engages the bistable medium 121 where it undergoes flip-flop action as shown in FIG. 2*c* as its power falls above and below the switching thresholds of the bistable hysteresis.

Figure 3:
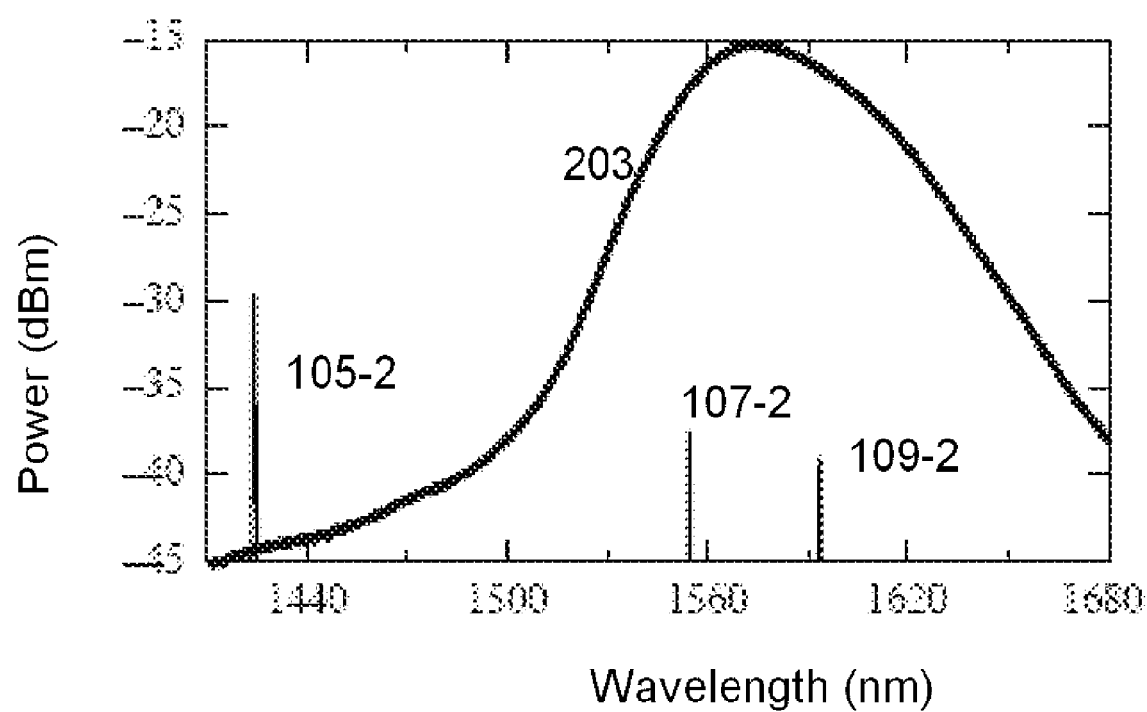
FIG. 3 is a graph that illustrates how the SET and RE-SET signals and the holding beam overlap the gain spectrum of a remote holding beam SOA power modulator according to an illustrative embodiment of the invention.

According to this non-limiting illustrative embodiment, the process of XGM of the holding beam can be further described with reference to FIG. 3, where the horizontal axis has the units of wavelength (nm) and the vertical axis has the units of power (dBm). FIG. 3 illustrates a portion of a non-linear, SOA holding beam modulator gain spectrum 203 represented by the amplified spontaneous emission (ASE) of the SOA, a SET signal 105-2 at 1424 nm, a RE-SET signal 107-2 at 1555 nm, and a holding beam 109-2 at 1593 nm. The figure illustrates the spectral overlap of the control signals, the holding beam, and the SOA-gain spectrum. Since the 1593 nm holding beam falls within the gain spectrum 203, it experiences a change in power for any change in the SOA gain. The 1425 nm SET pulse 105 falls to the short-wavelength side of the gain spectrum and has sufficiently high photon energy to be absorbed and generate charge carriers that provide additional gain for the holding beam 109-2, thus increasing its power. The 1555 nm RE-SET pulse 109-2, on the seen in FIG. 3, the RE-SET signal falls inside the SOA gain spectrum and initiates stimulated other hand, reduces the holding-beam power by saturating the gain of the SOA. As emission, which depletes the SOA gain.

Figure 4:
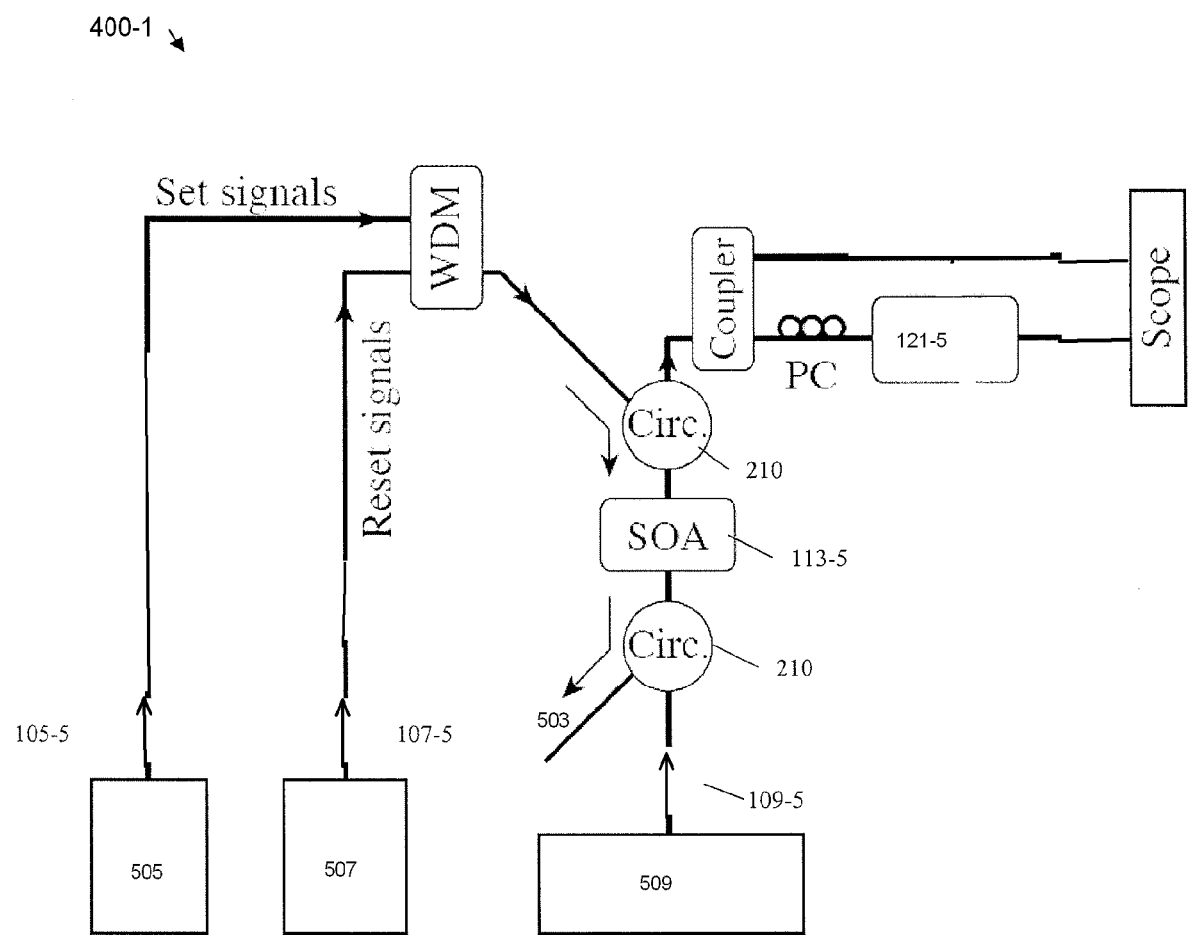
FIG. 4 is an optical circuit diagram of an illustrative experimental device used to demonstrate total remote optical control according to a non-limiting, exemplary embodiment of the invention.

FIG. 4 schematically illustrates an experimental implementation of a remotely-controlled, holding beam-type all-optical flip-flop device 400-1 and its operation according to a non-limiting exemplary embodiment of the invention. Optical SET signal pulses 105-5 are generated by SET control signal generator 505; likewise, optical RE-SET signal pulses 107-5 are generated by RE-SET control signal generator 507. The SET control signal pulses and the RE-SET control signal pulses (the control signals) were each approximately 1 ns in duration. The control signal pulses were input to the non-linear, SOA holding beam power modulator 113-5 with peak powers of 0.4 mW and 0.02 mW, respectively, as shown in FIG. 2a. The RE-SET signal required substantially less power than the SET signal because it experiences gain within the SOA, whereas the SET signal experiences absorption. The control signals were sent through the SOA modulator 113 in a counter-propagating fashion via optical circulators 210 and were subsequently monitored and discarded at 503. The cw holding beam 109-5 originated from a tunable diode laser 509 and was injected into the SOA 113 with an input power of 0.1 mW. The illustrative SOA modulator 113 was a commercial high-speed device capable of 40 Gb/s operation, driven at 85 mA. The approximately 0.39 mW holding beam exiting the SOA under the influence of the control signals, as shown in FIG. 2b, was increased in power by 0.02 mW, and decreased by 0.22 mW, by the SET and RE-SET signals, respectively. Although the experimental equipment limited the pulse width to 1 ns, XGM was expected to work for pulse durations of 10 ps or less.

The bistable output from the flip-flop is shown in FIG. 2c. The illustrative bistable medium 121-5 was a Fabry-Perot SOA driven at 98% lasing threshold. The power switched on and off with a 20-80% rise and fall time of 1 ns. This duration is on the order of that of the switching pulses and also of the oscilloscope bandwidth of 1.5 GHz. The output power remained latched until the RE-SET-signal-reduced portion of the holding beam entered the flip-flop. This latch duration may be made as long as possible, but its shortest duration will be limited by the response of the flip-flop's nonlinearity. In principle, SOAs have been demonstrated as fast as 40 Gb/s.

The holding beam wavelength was desirably tuned near a strong resonance of the FP-SOA. Both the SET and RE-SET pulses, however, can act over a long wavelength range. The SET signal may have any wavelength that pumps the SOA, and thus may have a wavelength range of operation exceeding 100 nm. The RE-SET signal may be any wavelength that saturates the SOA, and thus may have a wavelength range of operation exceeding 40 nm.

Since the optical control signals act in a remote fashion, the flip-flop itself may, in principle, be any holding-beam enabled flip-flop. Using a distributed feedback (DFB) SOA bistable medium instead of a FP-SOA, for example, may provide additional advantages including, e.g., lower holding-beam power (on account of no surface reflection), integration into a monolithic photonic circuit, and the ability to improve the switching contrast by introducing grating nonuniformities.

Polarization controllers were used in the illustrative experimental set-up. Flip-flop operation is known to be highly dependent on the polarization state of the holding-beam. A change in its polarization changes the amount of injected light coupled into the bistable medium and may undesirably move the holding-beam power beyond the switching thresholds of the bistable hysteresis. However, the flip-flop performance was found to be independent of the control-signal polarization states.

According to an alternative, non-limiting exemplary aspect, the holding beam power may be modulated (i.e., increased and decreased) by a cross polarization rotation process effected by the optical SET and RE-SET control signals operatively engaging the nonlinear, holding beam power modulator.

Figure 5:
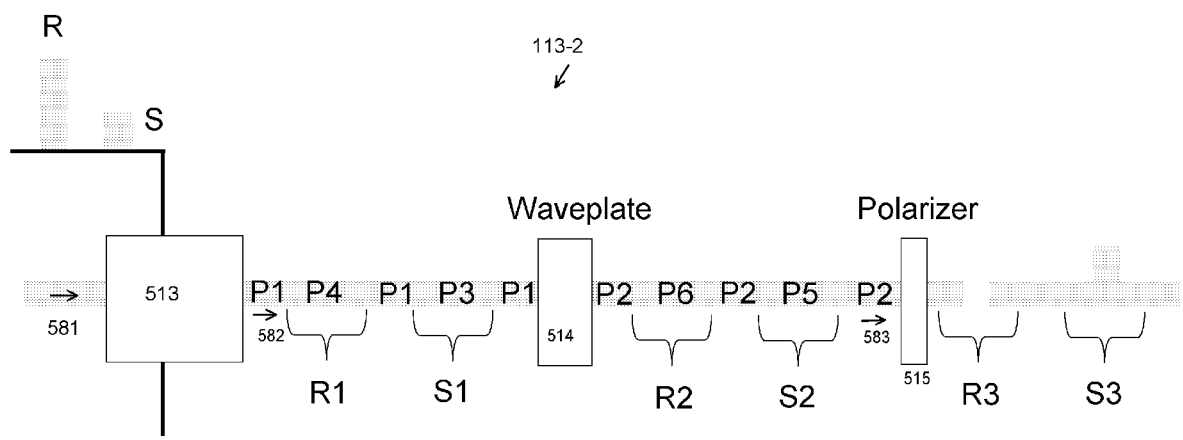
FIG. 5 schematically shows an alternative non-linear, holding beam power modulator according to a non-limiting exemplary embodiment of the invention.

FIG. 5 schematically shows a non-linear, holding beam power modulator 113-2 that includes a non-linear birefringent medium 513 followed by a waveplate 514 and a polarizer 515. Polarization-dependent optical control signals S and R induce birefringence (i.e., different refractive indices for orthogonal transverse directions across the medium) in the non-linear birefringent medium 513. Non-limiting examples of non-linear birefringent media include silica waveguides and SOAs having a significant amount of tensile strain within the material.

According to this aspect, injected light 581 is linearly polarized and is input to the non-linear birefringent medium 513 with its polarization axis aligned not parallel to either the fast or slow axes of the medium. The light output 582 from the medium will be of some initial polarization P1. The waveplate 514 changes the polarization P1 to a polarization P2 that is in general different than the initial linear polarization P1. Subsequent transmission through the polarizer 515 will depend on the polarization P2 of the injected light 583.

Operationally, the polarization of the holding beam is changed to P3 by the set signal S injected into the non-linear birefringent medium 513. The waveplate 514 then produces a polarization P5 at 583 different from its initial polarization P2 at 583, and results in an increase in power transmitted through the polarizer 515. For reset operation, the polarization of the holding beam at 582 is then changed to P4 by the reset signal injected into the non-linear birefringent medium 513. The waveplate 514 then produces a polarization P6 at 583 different from its initial polarization P2 at 583, and results in a decrease in power transmitted through the polarizer 515.

The foregoing examples have demonstrated all-optical flip-flop operation using optical SET and RE-SET control signals acting in a remote fashion. Remote action advantageously allows for the potential of controlling multiple flip-flops with a single pair of optical control signals. The demonstrated remote control techniques described above will allow all-optical SET and RE-SET control of any holding beam-enabled optical flip-flop.

Having thus described the various embodiments of the invention, it will be apparent to those skilled in the art that the foregoing detailed disclosure is presented by way of example only and thus is not limiting. Various alterations, improvements and modifications recognized by those skilled in the art, though not expressly stated herein, may be made and are intended to be within the spirit and scope of the claimed invention. Additionally, the recited order of processing elements or sequences, or the use of numbers, letters, or other designations, is not intended to limit the claimed processes to any order except as may be specified in the claims. Accordingly, embodiments of the invention are limited only by the following claims and equivalents thereto.

We claim:

1. A remote-control signal, holding beam-type, all-optical flip-flop device, comprising:
    a non-linear, optical, bistable medium characterized by an upward switching threshold and a downward switching threshold;
    a nonlinear, holding beam power modulator that can effect an increase and a decrease in the power of the holding beam, located remotely from the bistable medium;
    a holding beam generator that can generate a holding beam that can operatively engage the nonlinear holding beam power modulator;
    a holding beam propagation medium intermediate the nonlinear holding beam power modulator and the bistable medium;
    at least one control signal generator that can generate at least one of an optical SET control signal and an optical RE-SET control signal; and
    an optical control signal propagation medium disposed intermediate the at least one control signal generator and the nonlinear holding beam power modulator.

2. The device of claim 1, wherein the at least one control signal generator comprises an optical SET control signal generator and an optical RE-SET control signal generator.

3. The device of claim 1, wherein the optical control signal propagation medium is an optical RE-SET control signal propagation medium and an optical SET control signal propagation medium.

4. The device of claim 1, wherein the bistable medium is a dispersive bistability medium.

5. The device of claim 4, wherein the dispersive bistability medium is a resonant type semiconductor optical amplifier (RT-SOA).

6. The device of claim 5, wherein the resonant type semiconductor optical amplifier is a vertical cavity surface-emitting semiconductor optical amplifier (VC-SOA).

7. The device of claim 5, wherein the resonant type semiconductor optical amplifier is a Fabry-Perot SOA.

8. The device of claim 5, wherein the resonant type semiconductor optical amplifier is a distributed feedback SOA.

9. The device of claim 5, wherein the resonant type semiconductor optical amplifier is a ring-resonator with an internal SOA.

10. The device of claim 1, wherein the bistable medium is an absorptive bistability medium.

11. The device of claim 1, wherein the bistable medium is a combination dispersive/absorptive bistability medium.

12. The device of claim 1, wherein the bistable medium is a four-wave mixing bistability medium.

13. The device of claim 1, wherein the holding beam propagation medium is an optical waveguide.

14. The device of claim 1, wherein the optical control signal propagation medium is an optical waveguide.

15. The device of claim 1, wherein the nonlinear, holding beam power modulator is an optical amplifier.

16. The device of claim 15, wherein the optical amplifier is a travelling-wave semiconductor optical amplifier.

17. The device of claim 1, wherein the nonlinear, holding beam power modulator includes a nonlinear birefringent medium followed by a wave plate and a polarizer.

18. A method for controlling a holding beam-type, all-optical flip-flop device, comprising:
    generating an optical SET control signal pulse and an optical RE-SET control signal pulse;
    generating a continuous-wave holding beam;
    propagating the holding beam through a nonlinear, holding beam power modulator and into a non-linear, optical, bistable medium characterized by an upward switching threshold and a downward switching threshold; and
    propagating the optical RE-SET control signal and the optical SET control signal through the nonlinear, holding beam power modulator and decreasing and increasing the power of the holding beam, respectively.

19. The method of claim 18, comprising changing the power of the holding beam by a cross-gain modulation (XGM) process.

20. The method of claim 18, comprising changing the power of the holding beam by a cross-polarization rotation process.

21. The method of claim 18, comprising generating each optical SET control signal pulse and optical RE-SET control signal pulse from a common control signal pulse.

22. The method of claim 18, wherein the optical SET control signal is polarization independent.

23. The method of claim 18, wherein the optical RE-SET control signal is polarization independent.

* * * * *